United States Patent
Peabody et al.

(10) Patent No.: US 9,325,180 B2
(45) Date of Patent: Apr. 26, 2016

(54) USB POWER SUPPLY

(71) Applicant: Astronics Advanced Electronic Systems Corp., Kirkland, WA (US)

(72) Inventors: Mark A. Peabody, Redmond, WA (US); Jeffrey A. Jouper, Newcastle, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 217 days.

(21) Appl. No.: 14/026,217

(22) Filed: Sep. 13, 2013

(65) Prior Publication Data

US 2014/0167682 A1 Jun. 19, 2014

Related U.S. Application Data

(60) Provisional application No. 61/701,140, filed on Sep. 14, 2012.

(51) Int. Cl.
*H02J 7/00* (2006.01)
*H02J 7/02* (2016.01)
*H02J 7/04* (2006.01)

(52) U.S. Cl.
CPC ............ *H02J 7/0027* (2013.01); *H02J 7/0013* (2013.01); *H02J 7/022* (2013.01); *H02J 7/045* (2013.01)

(58) Field of Classification Search
CPC ... H05B 33/0803; H05B 33/0815; H02J 9/02; H02J 9/065; H02J 7/025; H02J 2007/0096; H02J 9/061; H02J 3/00; H02J 17/00; H02J 2007/006; H02J 2007/0062; H02J 5/005; H02J 7/0003; H02J 7/0068
USPC .................................................. 320/106–115
See application file for complete search history.

(56) References Cited

U.S. PATENT DOCUMENTS

| | | | |
|---|---|---|---|
| 5,754,445 A | 5/1998 | Jouper et al. | |
| 6,016,016 A | 1/2000 | Starke et al. | |
| 8,089,181 B2 | 1/2012 | Jouper et al. | |
| 8,261,100 B2 * | 9/2012 | Paniagua et al. | 713/300 |
| 2008/0309297 A2 | 12/2008 | Brown et al. | |
| 2010/0181961 A1 * | 7/2010 | Novak et al. | 320/108 |
| 2013/0026825 A1 | 1/2013 | Savage et al. | |

* cited by examiner

*Primary Examiner* — Binh Tat
(74) *Attorney, Agent, or Firm* — Wiggin and Dana LLP; Gregory S. Rosenblatt; Jonathan D. Hall

(57) ABSTRACT

A power supply system effective to provide power to a plurality of different personal electronic devices includes a source of AC or DC power, a power converter effective to convert the AC or DC power to a useable voltage and amperage, a remote power outlet or a plurality of remote power outlets each configured to receive one or more connectors and a signal decoder. The signal decoder determines the requirements of a connected one of the personal entertainment devices and personal computing devices and apply the requirements to the power outlet for powering the device.

15 Claims, 16 Drawing Sheets

CONTINUED ON FIG.1B

USB POWER SUPPLY

CROSS REFERENCE TO RELATED APPLICATION

This patent application claims a benefit to the filing date of U.S. Provisional Patent Application Ser. No. 61/701,140, titled "USB Power Supply," that was filed on Sep. 14, 2012. The subject matter of that provisional patent application is incorporated by reference herein in its entirety.

U.S. GOVERNMENT RIGHTS

N.A.

BACKGROUND

1. Field

This invention relates to a charging station system for personal electronic devices, including personal entertainment and computing devices such as smartphones and tablet computers. More particularly, this invention relates to a charging port is adaptable to multiple electronic devices so as to best utilize the system.

2. Description of the Related Art

A system to provide power from a supply of limited power is disclosed in U.S. Pat. No. 5,754,445, to Jouper et al., that is titled "Load Distribution and Management System." Such a system may be used to provide power to passengers on an aircraft to enable extended time use of personal entertainment devices and personal computing devices on long flights. A voltage supply device disclosing an outlet for use in an aircraft cabin is disclosed in U.S. Pat. No. 6,016,016, to Starke et al., that is titled "Voltage Supply Apparatus." Both U.S. Pat. Nos. 5,754,445 and 6,016,016 are incorporated by reference herein in their entireties.

Many personal entertainment devices, phones and personal computing devices receive power through a USB (universal serial bus). However, devices utilizing USB connectors as power connectors for charging often possess different charging requirements, such as current and charging scheme requirements. For example, the maximum currents for iPADs, iPHONEs and Samsung Galaxy phones are 2.1, 1 and 1.8 Amps, respectively. Previously, a traveler who is carrying one or more of a number of popular electronic devices and who locates a charging port may nonetheless find that the located port does not support the current or charge mechanism required for one or more of their particular devices. To accommodate newer devices in an ever changing world, the system disclosed herein is adaptable to many different devices to reduce the number of traveler complaints and gain best utilization of the system

BRIEF SUMMARY

The details of one or more embodiments are set forth in the accompanying drawings and the description below. Other features, objects and advantages will be apparent from the description and drawings, and from the claims.

The device disclosed herein supplies sufficient power to charge personal electronic devices, such as iPads, etc., via USB outlets. In accordance with the disclosed concept, each time a new tablet or device is introduced in the market, many of the devices have a unique biasing or communication protocol specific to that device, which is required to enable charging. By locating the communication/biasing in a remote USB outlet, separate from the power supply itself, a system can be created that allows airlines, hotels, etc. to only have to replace or reprogram the outlet if new technology requires it, instead of the entire power supply system, resulting in significant potential cost savings over previously methodologies and systems.

BRIEF DESCRIPTION OF THE DRAWINGS

FIG. 10 schematically illustrates a voltage compensation circuit for use with systems disclosed herein.

Like reference numbers and designations in the various drawings indicated like elements.

DETAILED DESCRIPTION

Figure 1A:
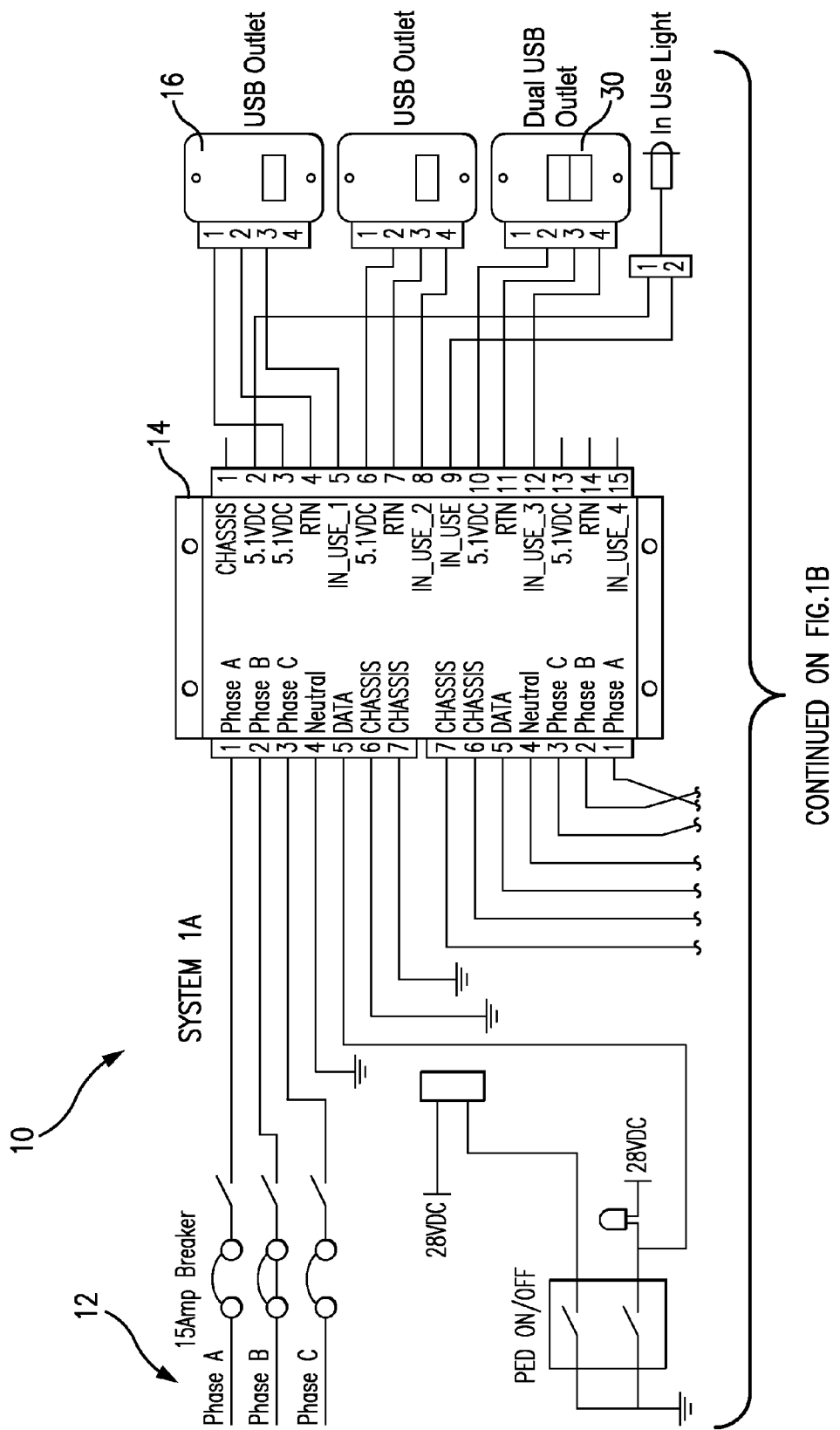
FIG. 1A schematically illustrates a portion of an embodiment USB charging system.
Figure 1B:
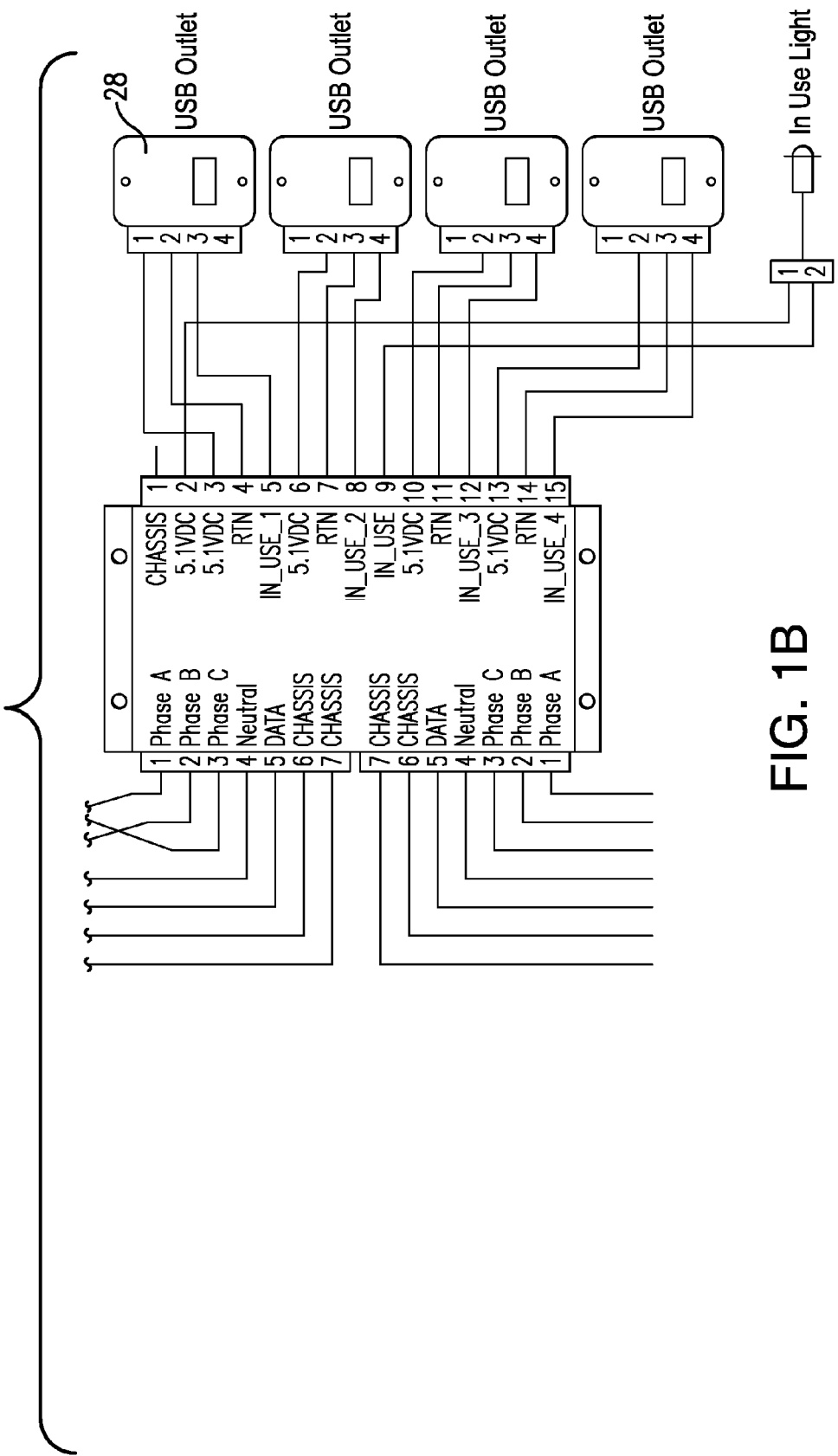
FIG. 1B schematically illustrates the remainder of the USB charging system partially illustrated in FIG. 1A.

FIGS. 1A-B schematically illustrate an embodiment USB system 10 that is primarily a charging station allowing up to four users to power, charge and operate devices at the same time. Power is supplied from an AC source 12, such as a generator on an aircraft, and converted in an AC-DC power supply 14 to a usable voltage of 5.2VDC to power outlet units 16. As shown in block diagram in FIGS. 2A-B, power supply 14 of FIGS. 1A-B contains an EMI filter 18, Power Factor Correction front end 20, DC-DC converter 22, Data Keyline decoder circuit 24 and output control circuit 26. Schematic representations of the EMI filter 18, power factor correction 20, DC-DC converter, data keyline decoder circuit 24 and output control circuit 26 are found in FIGS. 3A-FIG. 7B, respectively.

The power factor correction (PFC) front end 20 is a standard boost converter implementation. The DC-DC converter 22 is a quasi-resonant converter used to convert the high voltage DC output of the PFC 20 to the 5.2VDC used to power the USB charging circuits. The Data Keyline decoder 24 interprets a tri-state control signal to activate or de-activate the output of the power supply 14.

Figure 9A:
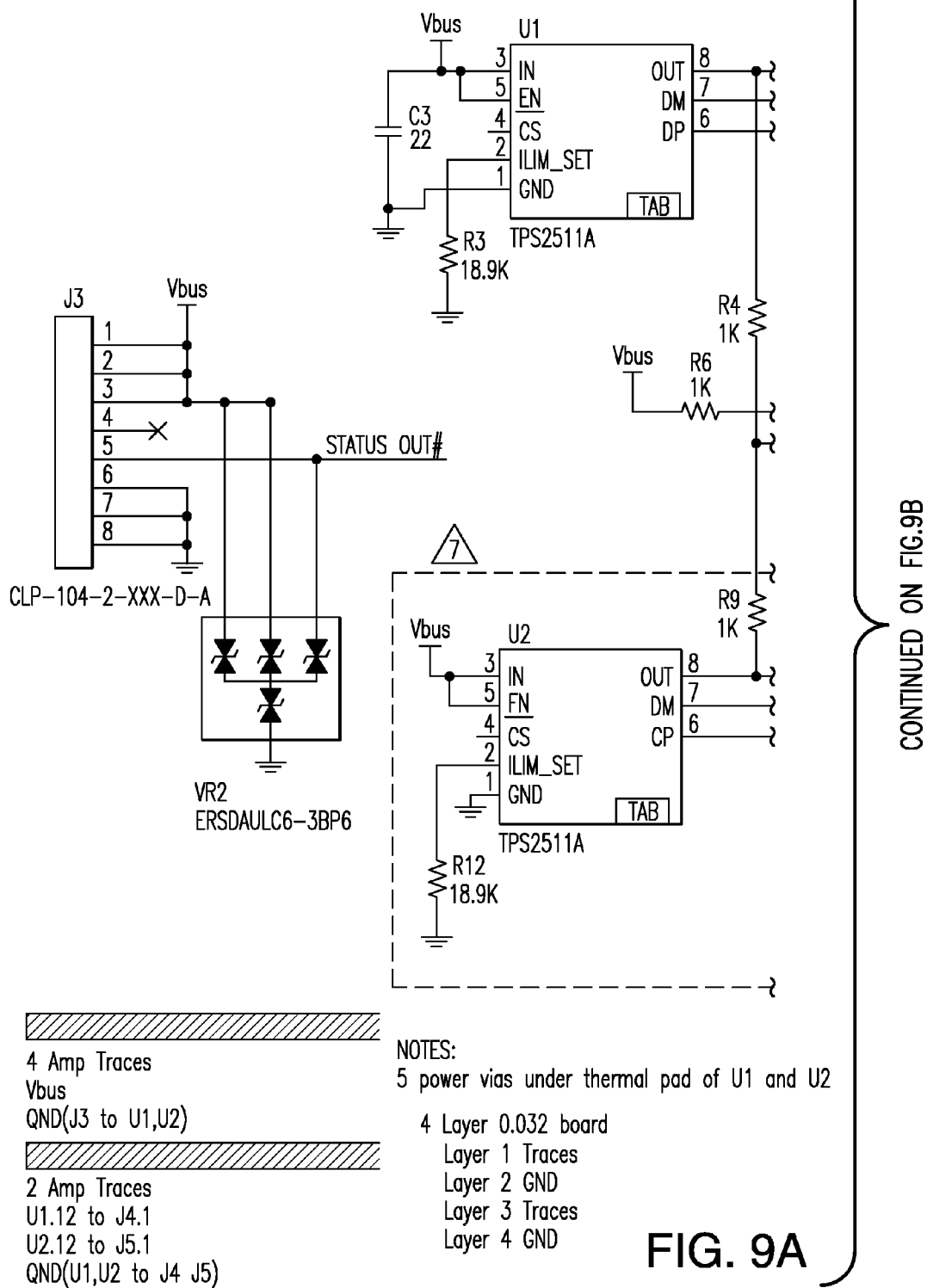
FIG. 9A schematically illustrates a portion of the outlet of FIG. 1A and FIG. 1B.
Figure 9B:
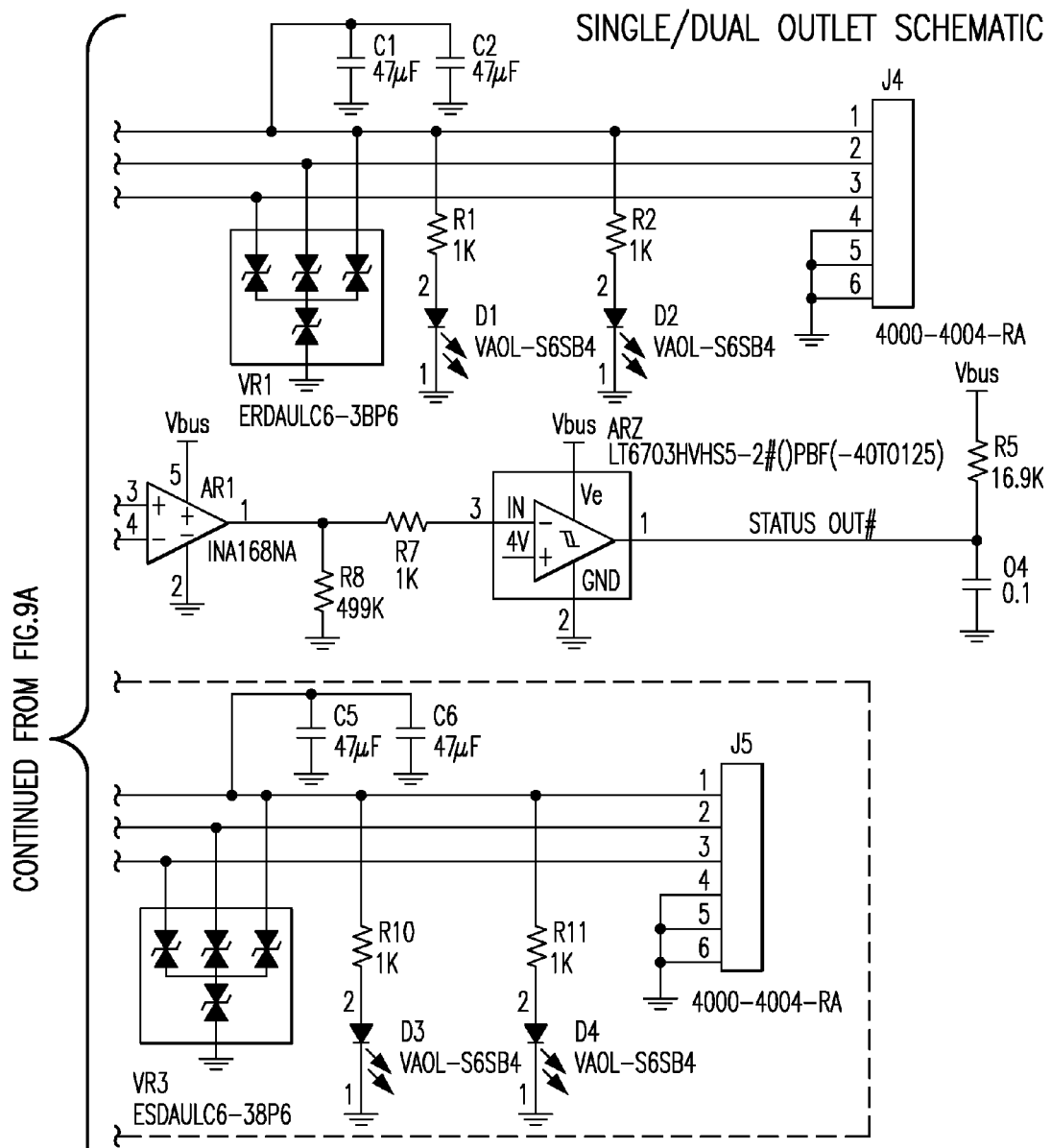
FIG. 9B schematically illustrates the remainder of the outlet partially illustrated in FIG. 9A.

With reference back to FIGS. 1A-B, the outlets 16 are control circuits that implement an adaptive control feature to allow charging of different devices each with different biasing mechanisms from a common USB Type A connector. Manufacturers of various tablet computing devices, such as the iPAD or Google Nexus 7, have implemented differentiating control mechanisms based on the current requirements to power and charge the device. As an example, Apple uses a DC biasing on the D+ and D− pins of 2.7 and 2.0 respectively for the iPAD and 2.0 and 2.7 on D+ and D− for the iPHONE. This differentiates between the low power adapter furnished with the iPHONE from the higher power adapter furnished with the iPAD. Samsung uses a shorting method where the D+ and D− lines are connected together through a 200 Ohm impedance. In FIGS. 9A-B, the D+ and D− signals are DP and DM from the controller integrated circuit to pins 2 and 3 of the outlet connector. A chipset exists today that will automatically cycle through these control methods in an attempt to charge as many devices as possible. In addition to the control mechanisms, different current level requirements exist for different devices.

Figure 2A:
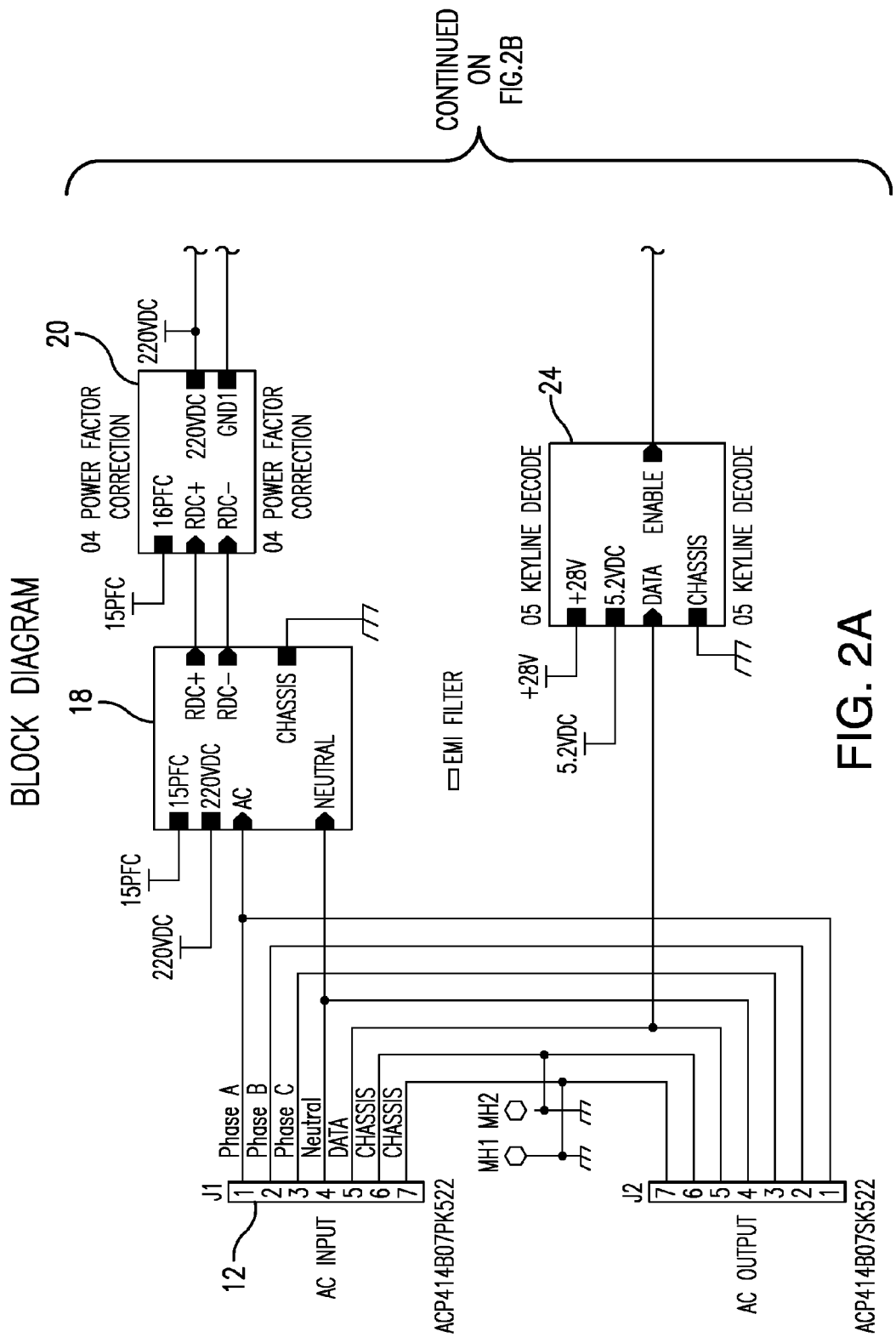
FIG. 2A illustrates a portion of the power supply component of FIG. 1A and FIG. 1B.
Figure 2B:
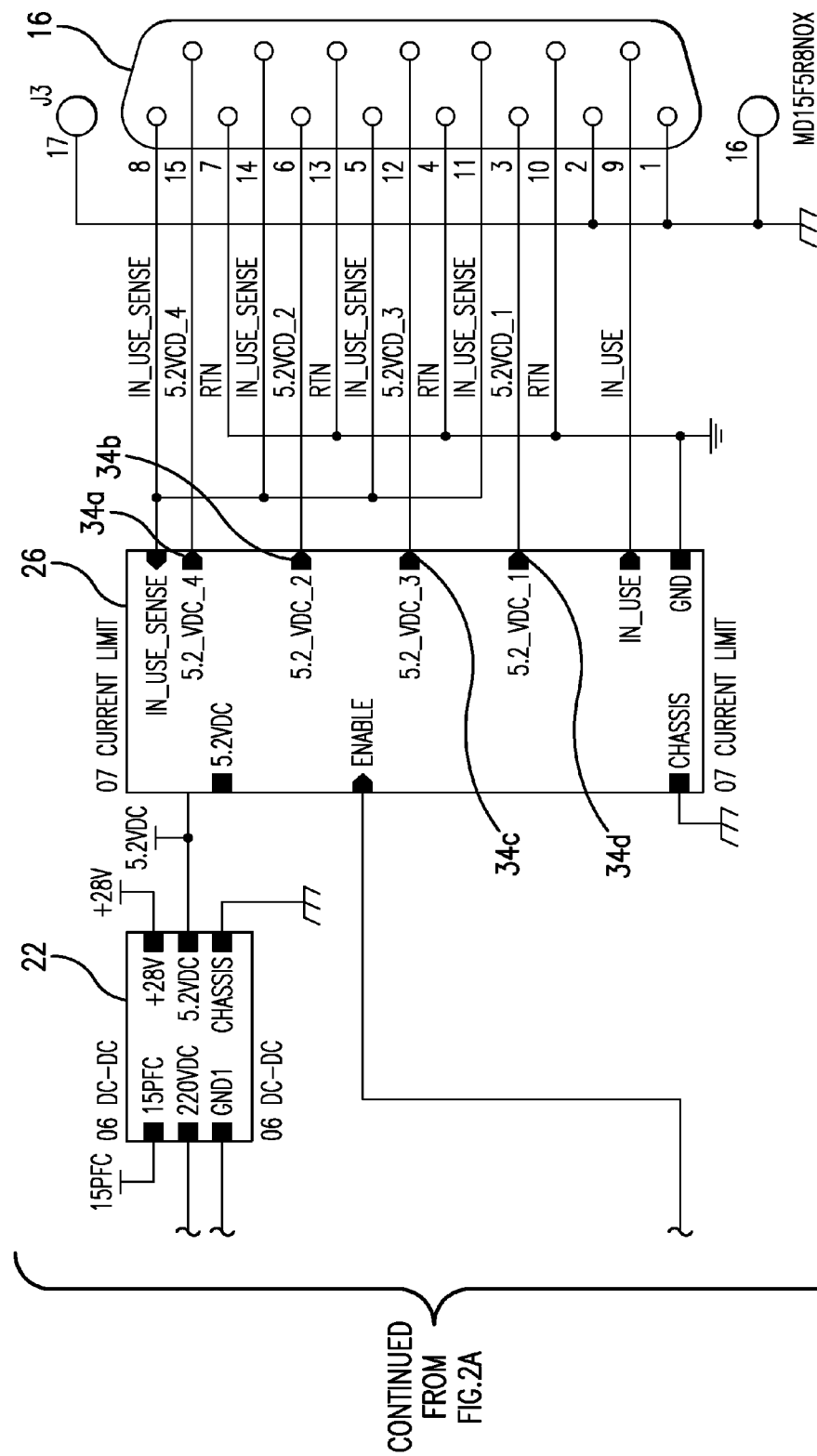
FIG. 2B illustrates the remainder of the power supply component illustrated in FIG. 2A.

With reference to FIGS. 2A-B, an embodiment system aims to solve the problem of upgradability of the system with the least impact to the flying passenger and to the airline customer. To do this, the system places the primary power source 12 remote from the outlet 16 and the charge controlling circuits 18, 20, 22, 24, 26 within the outlet assembly. Each output of the power supply (34a, 34b, 34c, 34d) can supply up to 5 Amps at 5VDC. This power level is beyond the requirements of today's tablet computers to accommodate future growth in current requirements. Replacement of the outlet assembly can be easily done to change from a single control mechanism to multiple control mechanisms to future mechanisms.

With reference to FIGS. 1A-B, at least two outlet types are envisioned (and illustrated schematically in FIGS. 8 and 9A-B), although additional types may be accommodated. Single outlet 28 has a single charge control circuit and single USB Type A connector. The second version 30 has two USB Type A connectors with charge controllers. Such a configuration could, for example, provide one user with two USB connections or alternatively supply two users each with a single connection.

Figure 3A:
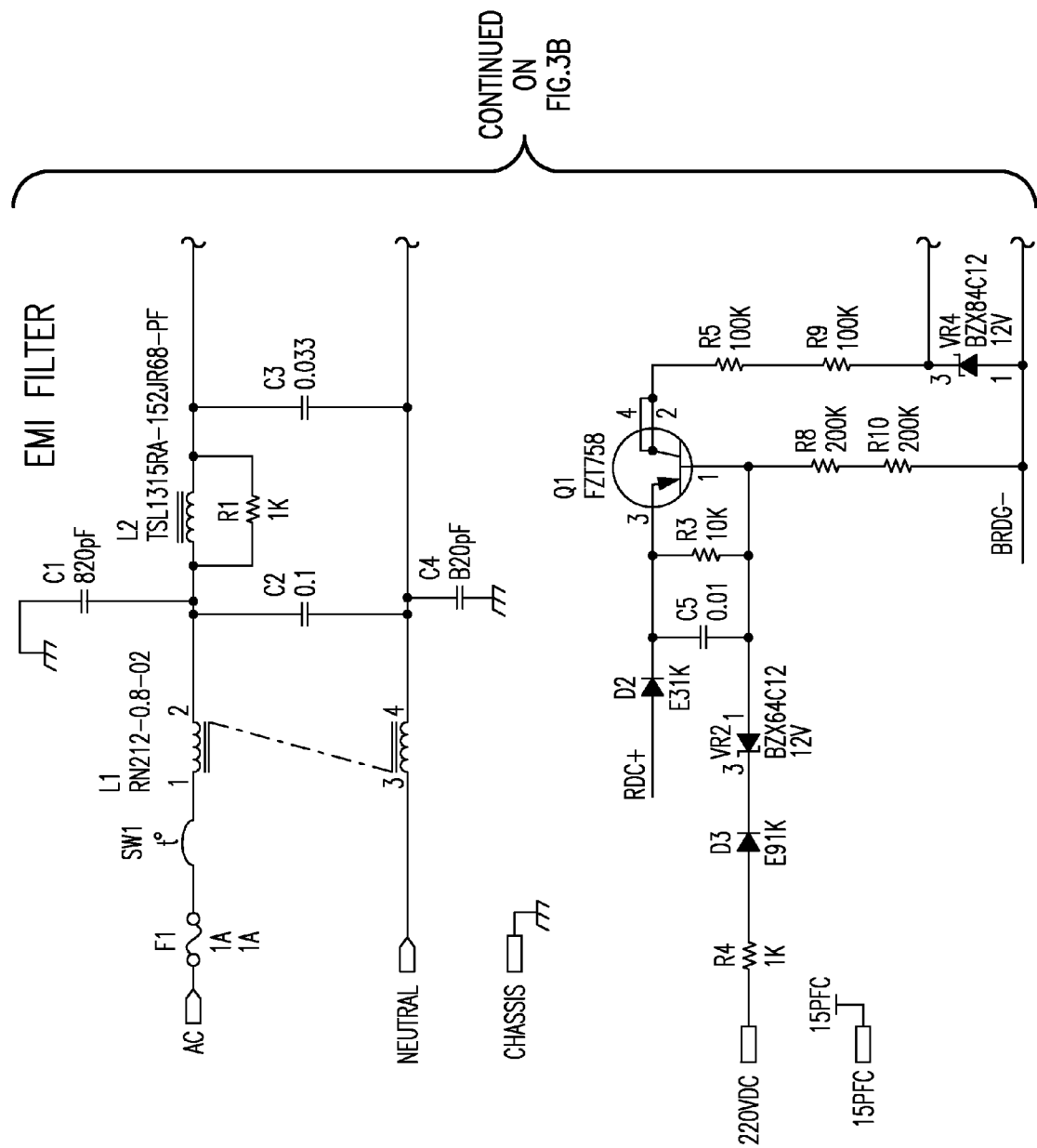
FIG. 3A schematically illustrates a portion of the EMI filter of FIG. 2A and FIG. 2B.
Figure 3B:
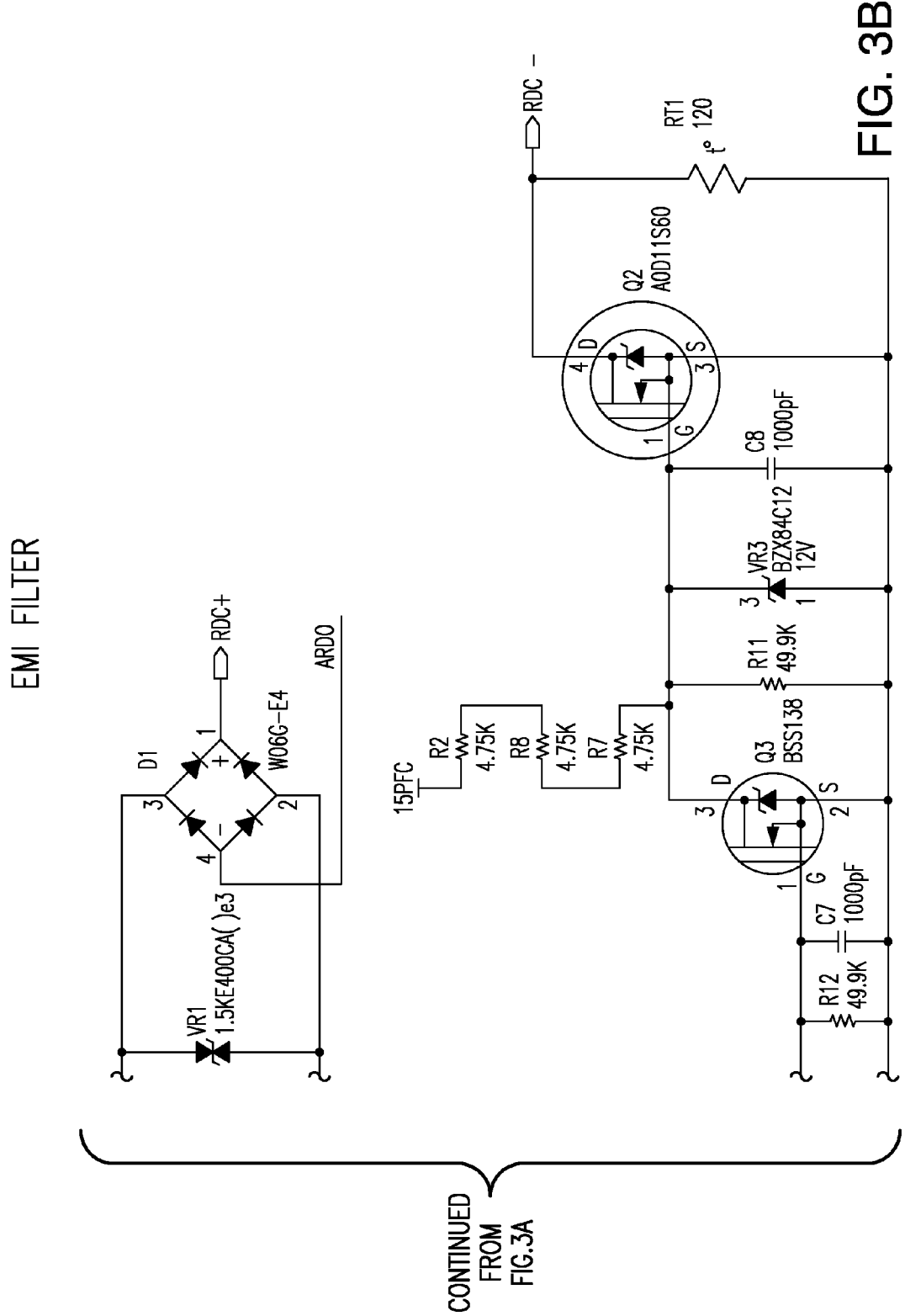
FIG. 3B schematically illustrates the remainder of the EMI filter partially illustrated in FIG. 3A.

FIGS. 3A through 7B schematically illustrate various embodiment circuit components of an embodiment power supply unit. Many variants of these power supplies may be used to perform the same function of converting the input AC power to DC output voltage required to operate the USB outlet. FIGS. 3A-B illustrates an embodiment input EMI filter (L1, L2 VR1 and associated capacitors), bridge rectifier (D1) and in-rush current limit (Q1, Q2, Q3) and associated components. AC power is passed through the filter, thereby blocking electromagnetic interference caused by the switching power supplies downstream of the filter. D1 rectifies the AC signal to only positive half sine waves. The in-rush limiting circuit limits input current during initial turn ON to bulk storage capacitor C8 of FIGS. 4A-B. Positive temperature coefficient resistor RT1 is placed in series with the bulk storage capacitor when the voltage across the bulk storage capacitor is less than the peak input line voltage.

Figure 4A:
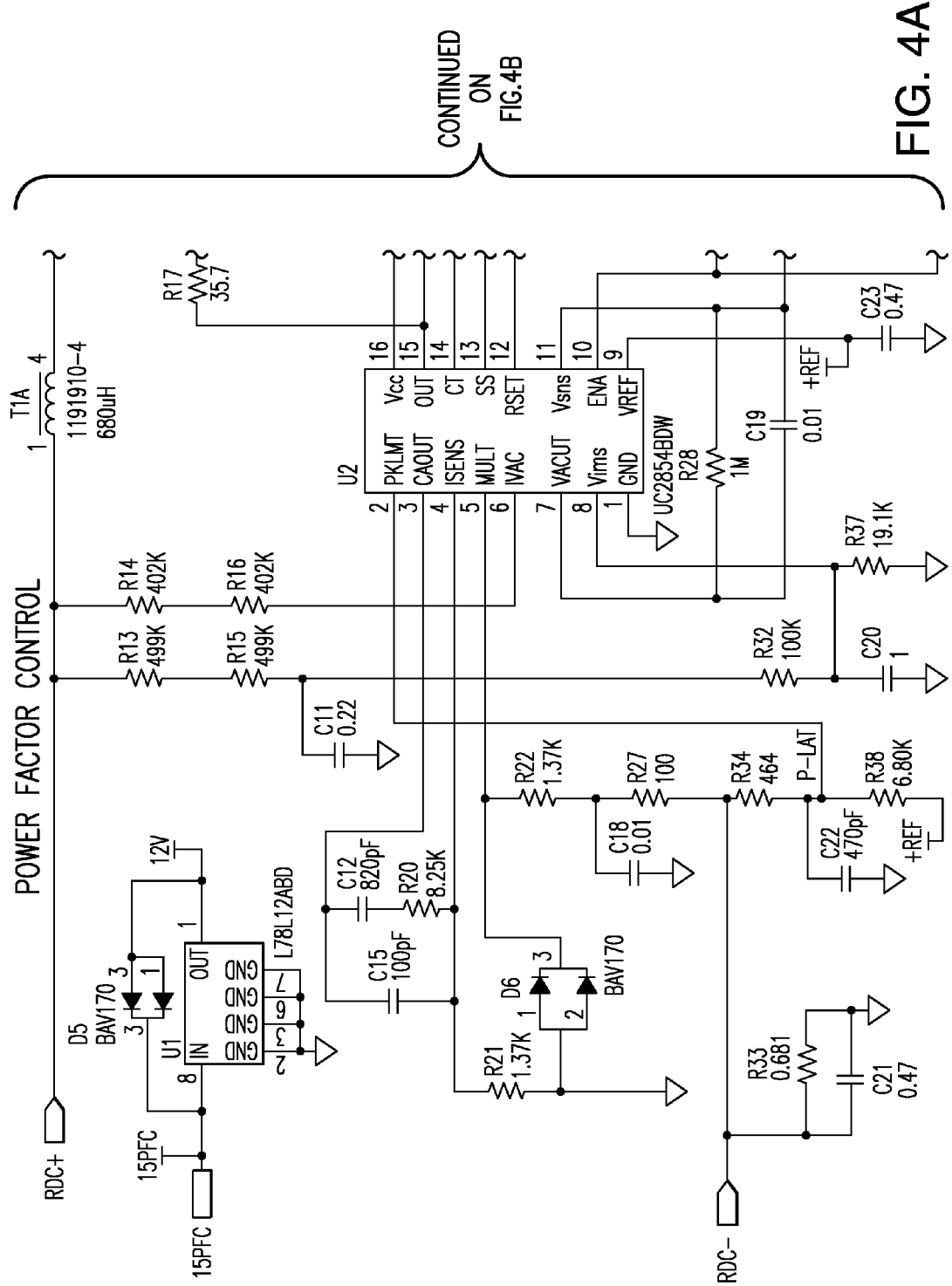
FIG. 4A schematically illustrates a portion of the power factor control of FIG. 2A and FIG. 2B.
Figure 4B:
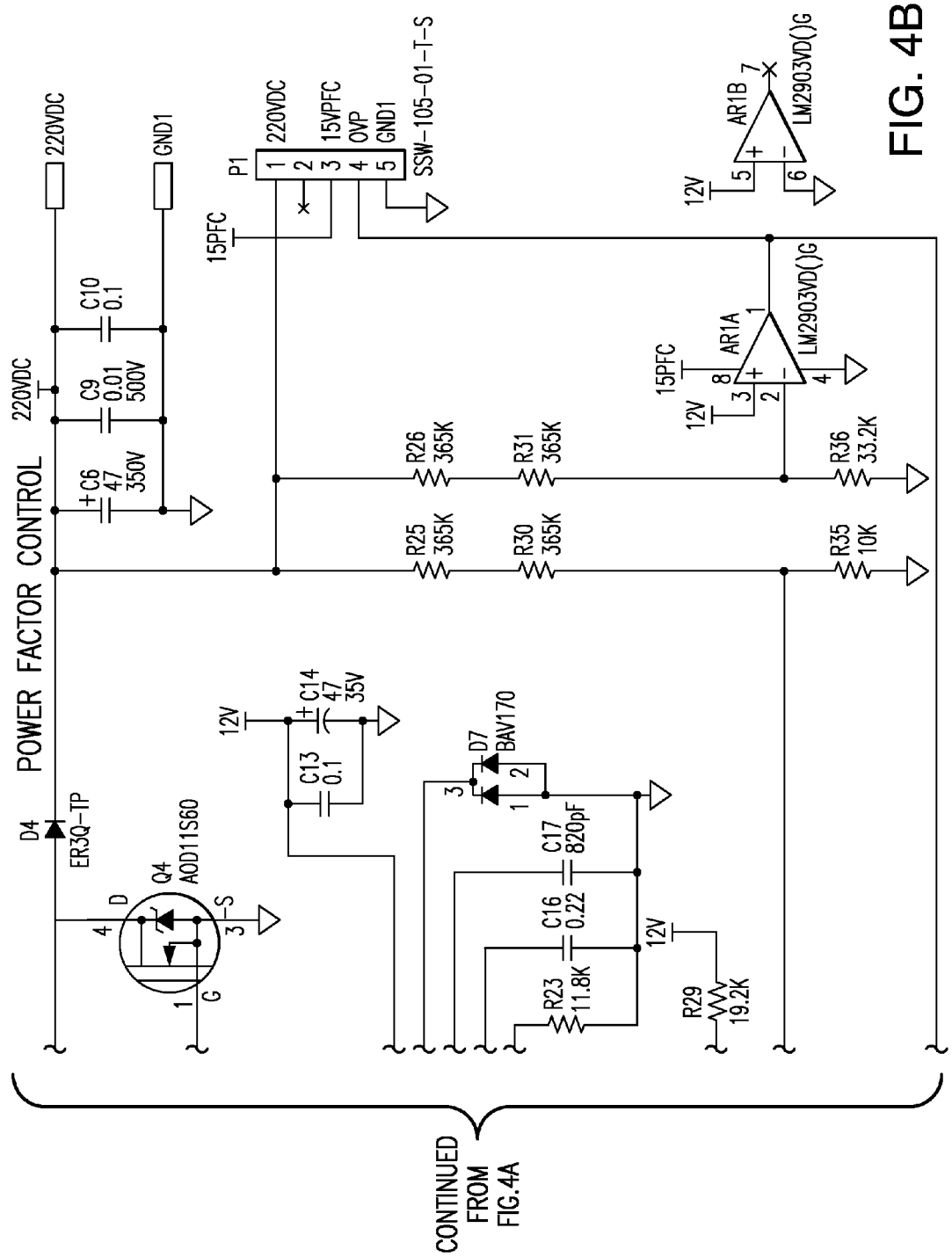
FIG. 4B schematically illustrates the remainder of the power factor control partially illustrated in FIG. 4A.

FIGS. 4A-B illustrate a boost converter power factor correction circuit used to create sinusoidal input current waveform to match the sinusoidal input voltage waveform creating low harmonic distortion and high power factor. The output of this stage is 220VDC to be used by the DC-DC converter to supply output power. U2 is a power factor controller integrated circuit used to monitor input voltage wave shape and program the pulse width modulation control to Q4. T1A is a boost inductor used to smooth the PWM current wave shape and cause the input current to match the input voltage waveform and achieve high power factor correction while at the same time producing a high voltage DC output. AR1A and associated sense resistors form an over-voltage monitor circuit.

Figure 5:
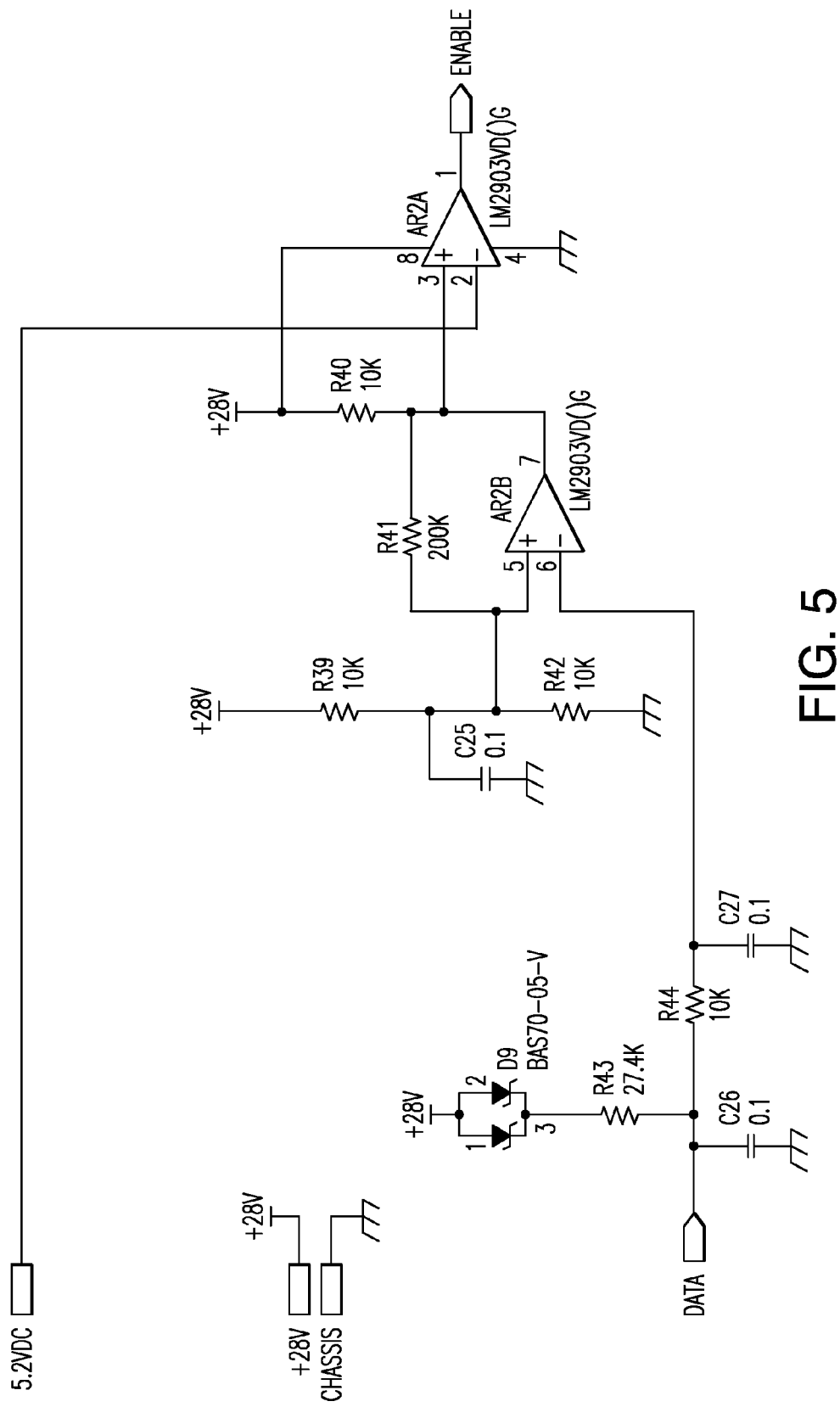
FIG. 5 schematically illustrates the keyline decoder circuit of FIG. 2A and FIG. 2B.

FIG. 5 illustrates a keyline decoder used to interpret the data keyline input to enable and disable the output of the power supply. A signal decoder can be used to determine the charging requirements of a connected personal electronic device and communicate these requirements to the power converter, optionally upon the fulfillment of a predetermined criteria, such as a difference between the supplied and required current or charging scheme. AR2B compares the voltage at the DATA input pin to a reference voltage formed by R39, R42. The reference voltage is programmed to match a switched input from the DATA input. D9 and R43 form a current source pull up to detect when the input to the DATA line is open. When the input is detected OPEN, the output of the entire power supply is disabled through the output switch.

Figure 6A:
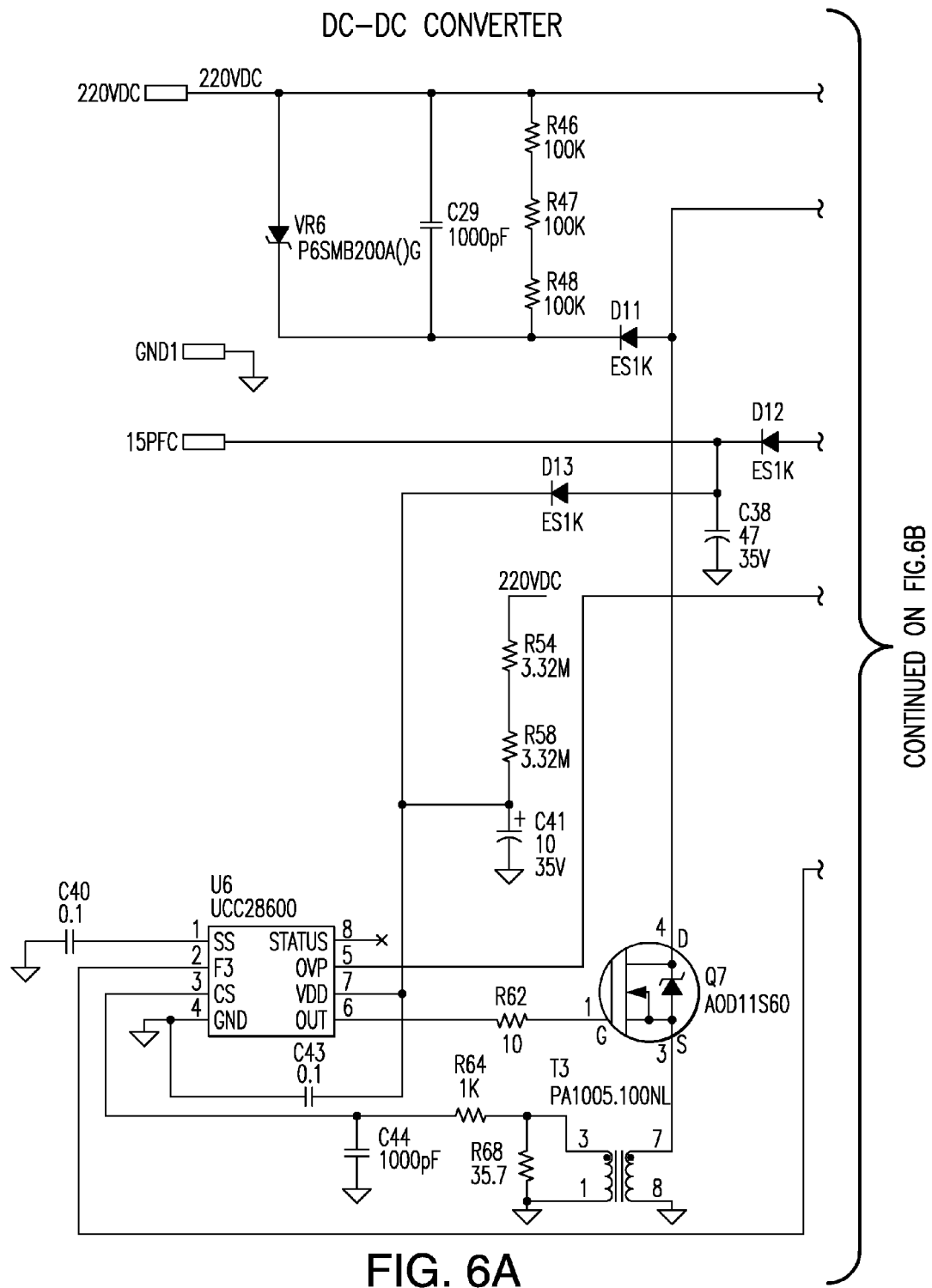
FIG. 6A schematically illustrates a portion of the DC-DC converter of FIG. 2A and FIG. 2B.
Figure 6B:
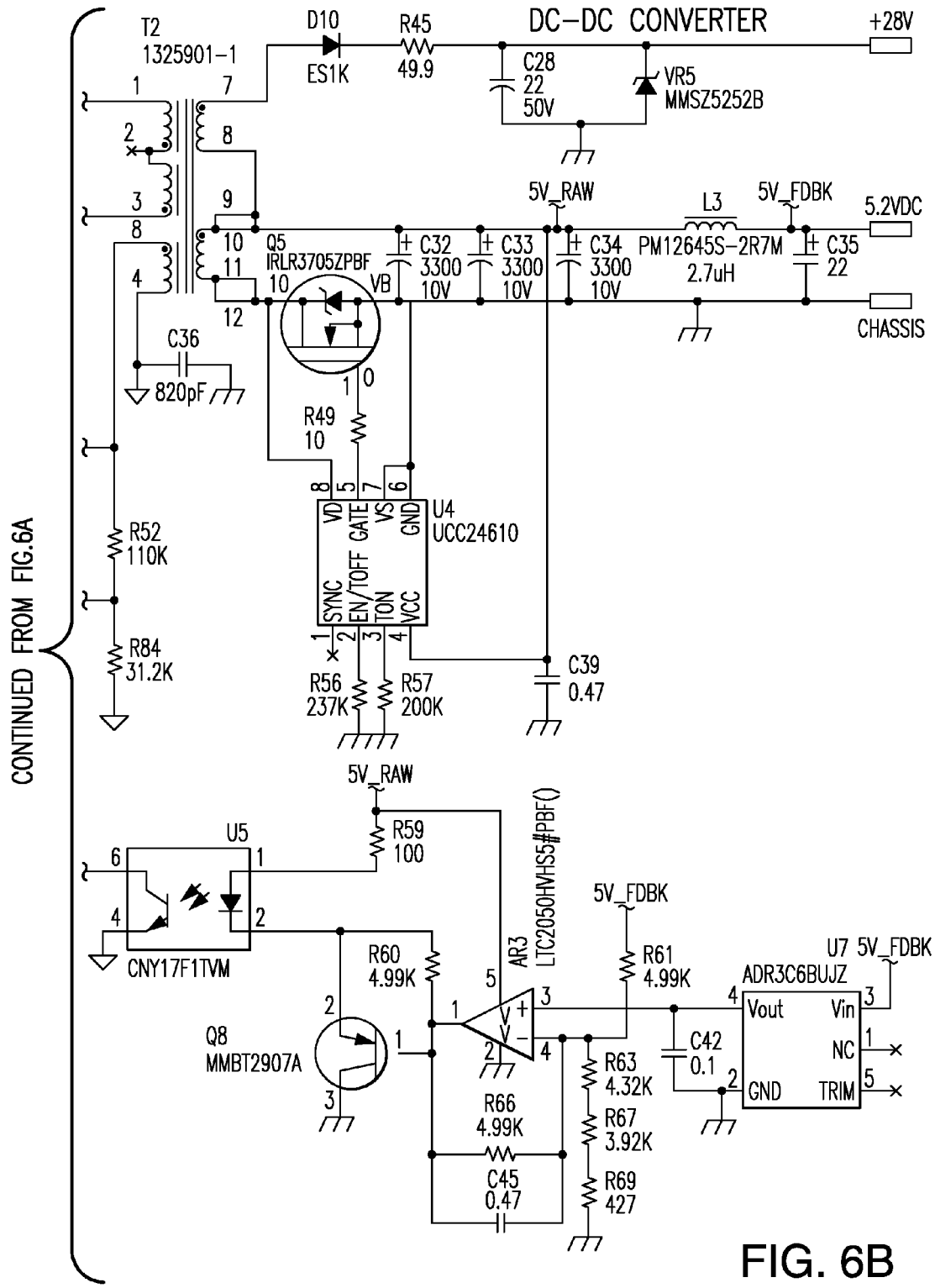
FIG. 6B schematically illustrates the remainder of the DC-DC converter partially illustrated in FIG. 6A.

FIGS. 6A-B illustrate a quasi-resonant flyback DC-DC converter used to convert the intermediate 220VDC bus voltage to 5.1VDC used to feed power to the outlet unit. U8 is the PWM control integrated circuit. U8 monitors the output voltage through a feedback network of AR3, U5 and associated components. U7 is a reference used in the comparison of the output voltage to this reference creating an error signal fed through U5 to U8. This error signal is used to control the pulse width of U8 out to Q7 in turn varying the output voltage of the converter to remain within the programmed output voltage of 5.1 +/−1%. U4 and Q5 form a synchronous rectifier circuit to increase the efficiency of the power supply by eliminating the forward rectifier voltage seen in standard rectifier circuits.

Figure 7A:
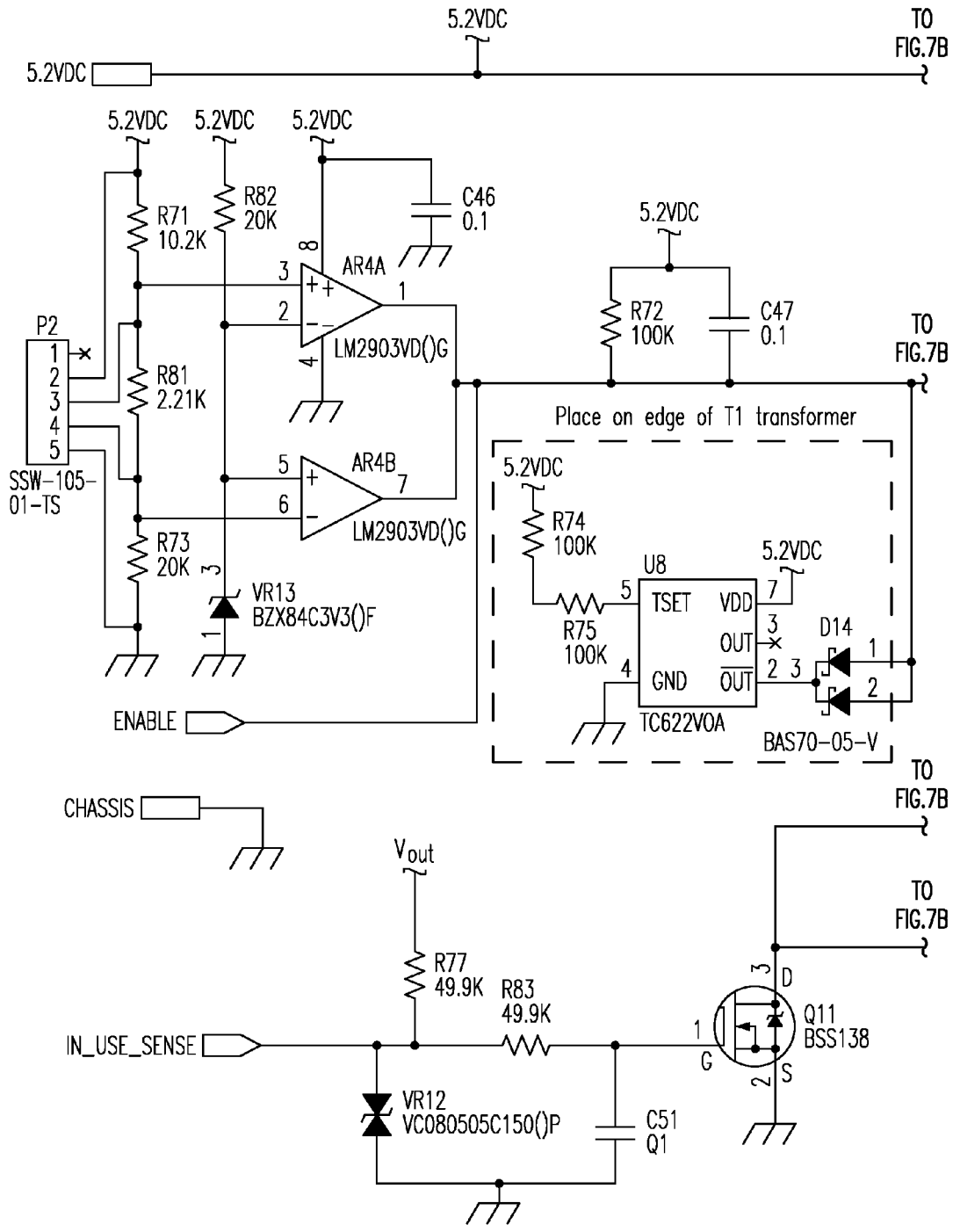
FIG. 7A schematically illustrates a portion of the output control circuit of FIG. 2A and FIG. 2B.
Figure 7B:
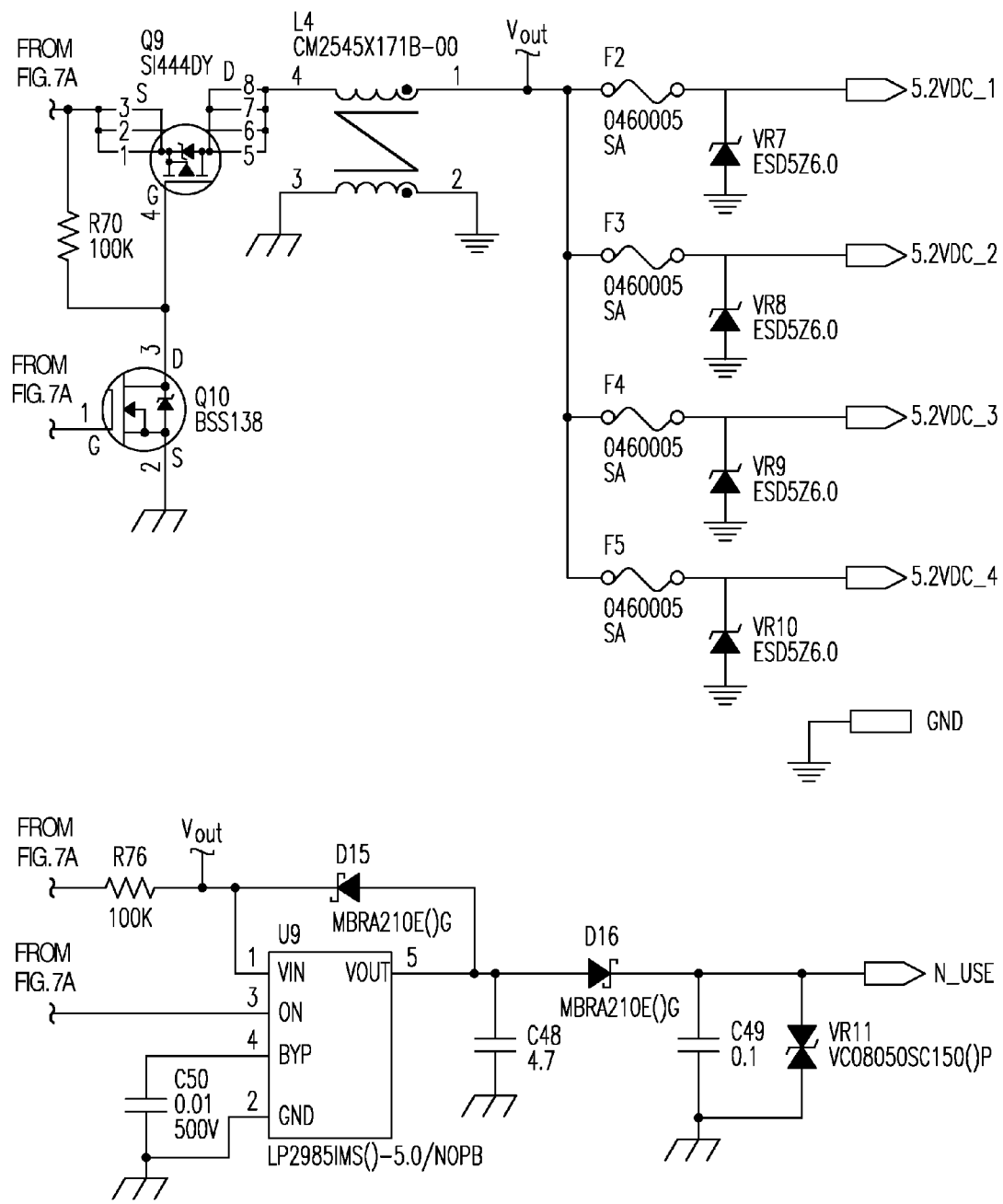
FIG. 7B schematically illustrates the remainder of the outlet control circuit partially illustrated in FIG. 7A.

FIGS. 7A-B illustrate the output control circuit and fused current limit of an embodiment. AR4 and associated components form a window comparator that monitor the output of the DC-DC converter to ensure it is within the programmed tolerance prior to allowing voltage to be activated to the output connector through Q9. U6 is a thermal limit detector used to monitor the temperature of the unit and, if the temperature is above the value programmed by R74 and R75, the output of the unit is removed by opening switch Q9.

The in-use circuit of Q11, U9 receives a signal from the outlet units that a user has plugged in to an outlet unit. All of the outlet units are OR'd together to a common signal called IN_USE_SENSE. This signal, when active, enables regulator U6 via Q11 to subsequently illuminate the IN_USE_LED as part of the system. The operation of the IN_USE is optional to the overall system. Various sense detectors, such as those that are optical, mechanical, or electrical in nature, may be used to determine when a user has plugged a mating connector of a device into the outlet and control the flow of power accordingly.

Figure 8:
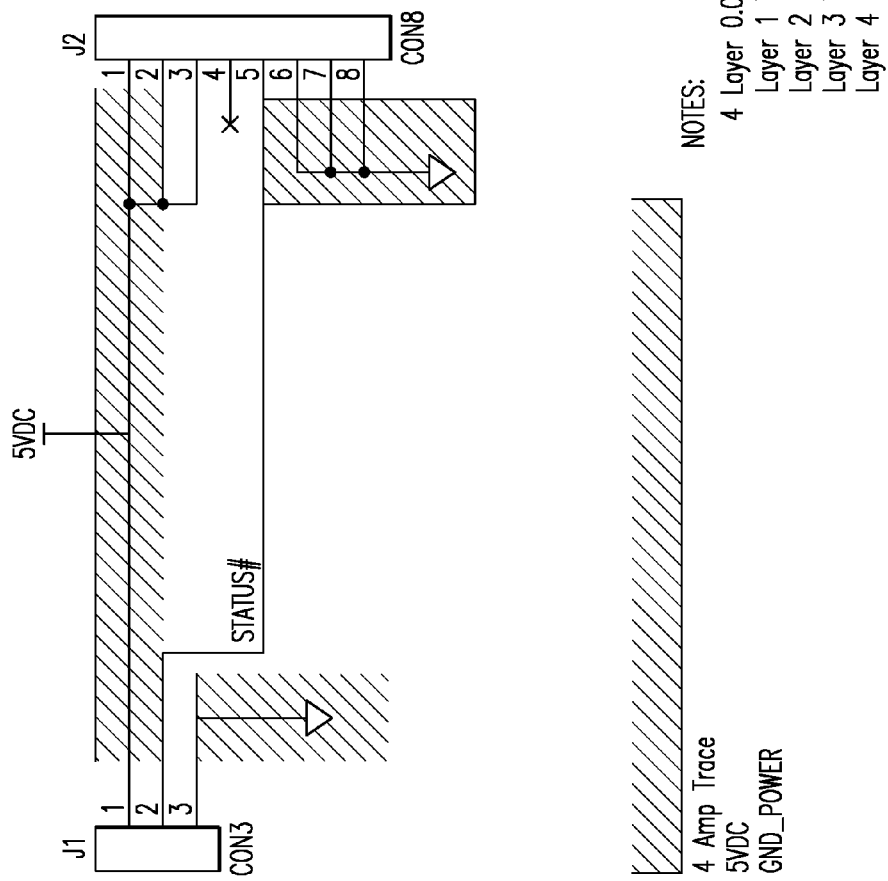
FIG. 8 schematically illustrates the outlet of FIG. 1.

FIGS. 8 and 9A-B illustrate the outlet unit assembly. FIG. 8 illustrates a pass through connector assembly used to bring the power through the 3 pin input connector to an 8 pin header inter-board connector. As an option, the connection from the 3 pin connector could go to a DC-DC converter in the outlet assembly to allow the outlet to operate on a different input voltage than 5.1VDC as illustrated. The DC-DC converter could also be an AC-DC converter to allow the outlet to operate from an AC power source. It is a system option as to the input voltage to operate from.

FIGS. 9A-B illustrate the outlet unit charge controller. This is either a single outlet controller or optionally a dual outlet controller. The control integrated circuit U1 provides an output switch, current monitor circuit and control mechanism for different control system to the device attached to the outlet unit through the four pin USB Type A receptacle J4. U1 will cycle through several control systems to find the one matching the device attached such as an iPhone, iPad, Android tablet/phone etc.

With reference to FIG. 10, because the distance between the outlet and the power supply could be a significant distance, a moderate current with low voltage could cause degradation in performance based on resistive losses in the cable assembly to the outlet. As an example, assume a tablet consumes 2.1 Amps at 5VDC. If the length from the power supply was 10 ft. and the wire in the cable a reasonable wire gage 20AWG, the loss of voltage from the power supply to the outlet is equal to: Wire Resistance/ft*Current*distance*2 conductors=0.0109 Ohms*2.1*10*2=0.46 Volts loss. The specification for the USB charging is 5+/−5% at the outlet. This places the voltage at the outlet as 4.54 Volts, well outside the specification. To accommodate this, the output voltage of the power supply can be raised to 5.2VDC.

FIG. 10 illustrates a method to compensate for line loss in cables should long cable runs be necessary while maintaining accurate voltage control at the outlet unit charge controller. The Power Converter as an example would produce a nominal 5.1VDC at no load. When the load at the outlet begins to consume power, the current through the cable increase. With significant cable lengths, a voltage drop will exist across the cable interface degrading the power at the outlet. With the use of a remote outlet this is especially true. It is common for power supplies to have a remote load sensor at the load to compensate for these cable losses. The typical form of this is a four wire power supply where there is an output current source and a monitor back to the power supply of the load through two sense leads. The power supply is corrected by the sense voltage to remain within an operating voltage. In aircraft applications, the weight of the system is one of the most important features. Each wire or conductor from the power supply to the load must be careful considered.

In the outlet described, an in-use indicator is required for operation under some guidelines and therefore this interface is required to be available. This signal is either an open or is a connection to the return of the outlet unit. This signal can be dual purposed to allow for compensation of line loss by monitoring this signal when a user is plugged in and compensating the power supply output. The 2× Difference Amplifier measures the voltage drop across the cable interface sensing the voltage difference from the return of the power supply to the return of the outlet unit. The output is then adjusted by 2× this difference to compensate for loss in both legs of the current carrying conductors. The advantage of this circuit is the elimination of the two wire sense method and accomplishing an identical outcome based on cable loss compensation.

Another method to overcome this limitation is to perform a remote voltage sense mechanism. This typically takes the form of a two wire voltage sense to monitor the voltage at the load and adjust the power supply to compensate for the resistive loss.

A return signal from the outlet may be required to carry information from the outlet as to the status of a user plugged in and obtaining power from the system. This signal can be used as a dual purpose signal using it in two modes. When no user is plugged in, the signal is in the high state. When a user plugs in, the signal line transitions LOW and is clamped to the GND terminal in the outlet. While the signal is clamped LOW, it is at the same potential as the GND pin. As current is pulled by the device downstream, a potential is developed across the wire interface from the power supply to the outlet unit. The potential across this interface is one half of the total loss of the wire interface. This signal can be used to adjust the power supply output voltage at 2× the voltage sensed. This allows the signal wire to be a status line during plug detect and when a user is active and perform the function of voltage sensing when the user is active. Alternatively this could be a single sense wire tied to the GND of the outlet unit without the use of the status mechanism. Because it is essential to control weight on board an aircraft, the described method is preferred over previous methods by reduction of the number of wires between the power supply and the outlet unit.

One or more embodiments of the present invention have been described. Nevertheless, it will be understood that various modifications may be made without departing from the spirit and scope of the invention. Accordingly, other embodiments are within the scope of the following claims.

What is claimed is:

1. A power supply system for providing Direct Current (DC) to a plurality of personal electronic devices, at least two of which have different charging requirements, comprising:
    a source of Alternating Current (AC) power;
    a power converter configured to receive said AC power and being effective to convert said AC power to a DC voltage and amperage;
    a plurality of power outlets, each configured to receive said DC voltage and amperage from said power converter, and each configured to receive at least one power connector connected to one of said personal electronic devices; at least one load sensor effective to determine a measured load voltage at one of said power outlets then currently in use and communicate said measured load voltage to said power converter
    wherein each outlet has located in it a signal decoder effective to determine said charging requirements of at least one of said connected personal electronic devices and communicate said charging requirements to the power converter, thereby dictating the DC voltage and amperage converted by said power converter; and
    wherein said power converter is effective to increase said DC voltage to account for resistive losses occurring between said power converter and said one of said power outlets.

2. The power supply system of claim 1 wherein said power converter is configured to variably supply DC voltage and amperage at values and in a manner that is usable by a substantial number of consumer personal electronic devices according to said communicated charging requirements.

3. The power supply system of claim 1 wherein said charging requirements are at least one of a charging current requirement and a charging scheme requirement.

4. The power supply system of claim 1 wherein said power convertor and outlets are affixed within an aircraft.

5. The power supply system of claim 1 wherein said power connectors are of a USB configuration.

6. The power supply system of claim 1 wherein a sense detector is located in each of said power outlets that ensures that no power is provided to the respective outlet until a mating connector is inserted into the respective outlet.

7. The power supply of claim 6 wherein said sense detectors are at least one of optical, mechanical or electrical in nature.

8. A power supply system effective to provide appropriate power to a plurality of different personal electronic devices, comprising:
    a source of AC or DC power;
    a power converter effective to convert the AC or DC power to a useable voltage and amperage;

at least one remote power outlet, each configured to receive one or more connectors for connecting to and powering the personal electronic devices;

at least on load sensor effective to determine a measured load voltage at one of said power outlets then currently in use and communicate said measured load voltage to said power converter; and said power converter effective to increase said DC voltage to account for resistive losses occurring between said power converter and said one of said power outlets a signal decoder within each said remote outlet effective to determine the requirements of a connected one of said personal electronic devices and cause said power converter to supply a configured amount of power to said personal electronic device meeting the determined requirements of that device.

9. The power supply system of claim 8 wherein the source of said AC or DC power is an aircraft.

10. The power supply system of claim 9 wherein said remote power outlets are USB outlets located on an aircraft.

11. The power supply system of claim 8 further comprising a status indicator Light Emitting Diode (LED) configured to illuminate when one of said personal electronic devices is connected to said power supply system.

12. The power supply system of claim 8 wherein said power converter includes an EMI filter, power factor correction unit and a DC-DC converter.

13. The power supply system of claim 12 wherein said power factor correction unit has a front end that is a boost converter implementation.

14. The power supply system of claim 12 wherein said DC-DC converter is a quasi-resonant converter effective to convert a high voltage DC input into a 5.2 VDC output.

15. The power supply system of claim 12 wherein said signal decoder is configured to interpret a tri-state control signal and manage the output of said power supply.

* * * * *